INVENTOR.
JOHN R. BUTA
BY
Meyer, Tilberry & Body
ATTORNEYS

United States Patent Office 3,545,245
Patented Dec. 8, 1970

3,545,245
THRUST BEARING ARRANGEMENT AND APPARATUS FOR REMOVING THE SAME
John R. Buta, Salem, Oreg., assignor, by mesne assignments, to Gulf & Western Industrial Products Company, Grand Rapids, Mich., a corporation of Delaware
Filed Aug. 2, 1968, Ser. No. 749,816
Int. Cl. B21g 31/10; F16c 29/00
U.S. Cl. 72—238                                  8 Claims

ABSTRACT OF THE DISCLOSURE

A thrust bearing assembly especially suited for use in rolling mills for transmitting rolling force from the screw-down screws to the bearing chocks. The assembly disclosed includes a generally cylindrical bearing surface formed on the lower end of the screw; a first bearing member positioned between the screw and the chock and having a top bearing surface formed to mate with the lower end of the screw and a generally planar lower surface; means for continuously biasing the first member into engagement with the screw; and, a horizontally slidable anti-friction type thrust bearing cartridge having generally planar upper and lower surfaces and positioned between the first member and the chock.

The present invention is directed toward the bearing art and, more particularly, to an improved thrust bearing arrangement and apparatus for removing the same.

The invention is especially suited for use in a four-high type rolling mill and will be described with particular reference thereto; however, it will be appreciated the invention is capable of broader application and could be utilized in other types of mills, for example, two- or three-high mills, as well as, other types of machinery.

Nearly all conventional four-high rolling mills utilize large diameter screw-down screws which act against the chocks of the upper back-up roll to apply the necessary rolling forces through the back-up roll to the work rolls. In order to permit the screws to be turned somewhat easily and, also, to compensate for any misalignment between the ends of the screws and the surface of the chocks, large thrust bearing assemblies are positioned between the screws and chocks.

Normally, when it is desired to change rolls or roll sets, at least a portion of the bearing assemblies must be removed so that rolls can be raised or shifted as required for removal. In the past, various types of pivotally mounted frames or horizontal frames supported from the screws or back-up roll chocks have been provided to support the bearing assemblies and provide for their removal. Additionally, to reduce the distance the screw-down screws had to be "backed-up," the assemblies have been provided with flat upper and lower surfaces for engaging the end of the screw and the top of the chock, respectively. To obtain these flat surfaces, the internal construction of the bearing assemblies or "cartridges" was somewhat complex and costly.

The present invention provides an improved thrust bearing and support arrangement which facilitates bearing removal, is less complex and, accordingly, less costly than prior arrangements. Particularly, in accordance with a first aspect of the invention an improved thrust bearing arrangement is provided for a rolling mill of the type including a frame, at least one roll including a chock slidably mounted in the frame, and a screw-down screw for applying downwardly acting force to the chock. The improved thrust bearing arrangement includes a generally cylindrical bearing surface formed on the lower end of the screw; a first bearing member positioned between the screw and the chock and having a top bearing surface formed to mate with the lower end of the screw and a generally planar lower surface; means for continuously biasing the first member into engagement with the screw; and, a horizontally slidable anti-friction type thrust bearing cartridge having generally planar upper and lower surfaces and positioned between the first member and the chock.

In accordance with a more limited aspect of the invention, the means for continuously biasing the first bearing member into engagement with the screw includes a support frame through which the lower surface of the first member extends, the support frame also includes means for supporting the bearing cartridge.

As is apparent, by providing the first bearing member as an element separate and distinct from the bearing cartridge, the cartridge can be of simple construction. That is, the cartridge does not have to be arranged to provide for non-alignment between the end of the screw and the top of the chock (i.e. the axis of the screw not being exactly perpendicular to the surface of the chock). This is so because the first member can shift on the screw to bring its lower surface into parallelism with the top surface of the cartridge. An advantage of this is that the removable element, i.e. the cartridge, is lighter in weight and less costly. This becomes important considering that throughout the life of a mill the cartridges may have to be changed several times.

In addition to the above, the subject arrangement eliminates the need for supporting the bearings or their support frame from the mill screws or roll chocks. An advantage of this, as compared to chock supported arrangements, is that when the rolls are removed it is not necessary to provide hoisting mechanisms, etc. for lifting the bearings or support frame away from the chocks. Considering that the bearings and their support frame can total over a ton in a large mill, the desirability of this becomes apparent. When compared to screw supported assemblies, it can be seen that the subject system cannot be damaged by a malfunction of the screw drive or its controls, i.e. the support frame cannot be twisted by one screw being moved up further than the other.

Accordingly, a primary object of the invention is the provision of a simplified thrust bearing arrangement.

A further object is the provision of a thrust bearing arrangement of the type described wherein the construction of the bearing cartridge is less complex than prior cartridges.

Another object is the provision of a rolling mill thrust bearing arrangement wherein the bearing members are supported independently of the mill screws or chocks.

A still further object is the provision of a rolling mill thrust bearing arrangement wherein the entire bearing assembly is supported from a common frame provided with means for moving the cartridges horizontally out of the mill.

The above and other objects and advantages will become apparent from the following description when read in conjunction with the accompanying drawings wherein FIG. 1 is a view, partially in cross-section, through the top of a relatively conventional four-high mill stand;

Figure 1:
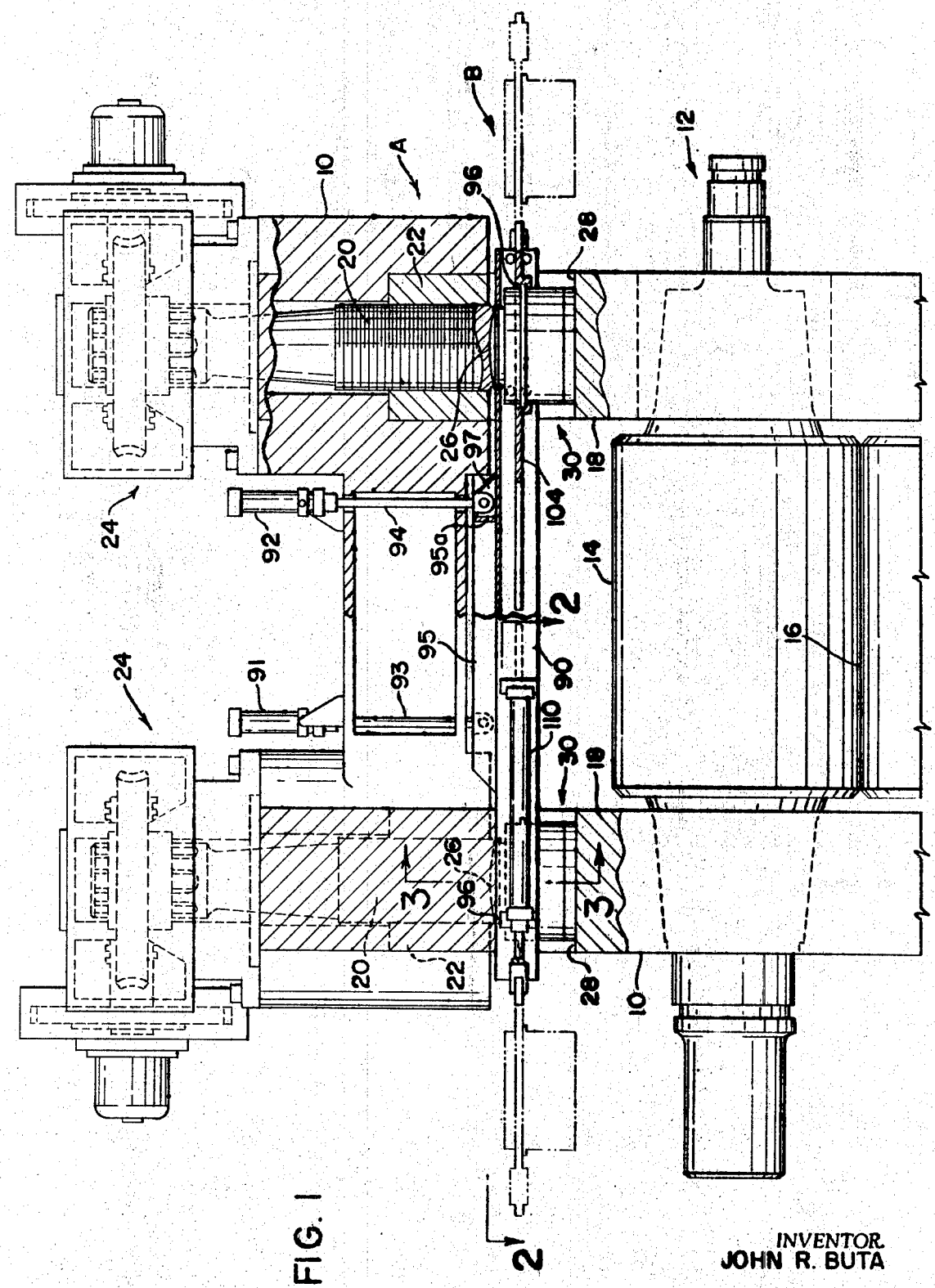

Referring more specifically to the drawings wherein the showings are for the purpose of illustrating a preferred embodiment of the invention only, and not for the purpose of limiting same, FIG. 1 shows, partially in cross-section, the upper portion of a relatively conventional 4-high mill A provided with the improved thrust bearing and bearing removal apparatus B. As is conventional, the mill A includes a main frame or mill housing 10 which carries the roll assemblies 12. In the FIG. 1 showing only the top back-up roll 14 and the top work roll 16 are shown however, it is to be understood that a second work roll and associated back-up roll is positioned subjacent those shown. The necks of back-up roll 14 are rotatably mounted in suitable bearing chocks 18 arranged for vertical sliding movement in the windows of mill frame 10. The necessary rolling forces are applied to the work rolls through the back-up roll by screw-down screws 20 carried in large nuts 22 fixedly mounted in the frame. The screws act vertically downwardly against the back-up roll chocks 18 and are driven in a conventional manner by reversible worm screw drive units 24 carried on the top of frame 10 and suitably keyed to the upper ends of the screws.

Positioned between the lower ends 26 of the screw-down screws 20, and the upper planar surface 28 of each respective bearing chock 18 are thrust bearing assemblies 30. Assemblies 30 transmit the required rolling forces from the screws 20 to the respective chock 18 and are arranged so as to compensate for misalignment between the end of the screw and its respective chock 18. Additionally, the bearing assemblies function to permit the screws to be readily rotated even under several million pounds of axial force. Although the assemblies could differ from each other slightly, in the present embodiment they are identical. Consequently, only the left assembly (as viewed in FIG. 1) will be described in detail and its description will be equally applicable to the right assembly wherein the elements shown will be identified by the same reference numerals.

In order that the upper back-up roll 14 may be raised a substantial distance away from the work rolls to provide ready access to, and easy removal of, the work rolls, it is standard practice to arrange the thrust bearing assemblies so that they may be removed from between the screw-down screws and the bearing chocks. The subject invention provides a bearing assembly and support arrangement which is highly simplified and permits the major portion of the assembly to be removed horizontally with only an extremely short upward movement of the screws 20. Specifically, referring to FIG. 3, it is seen that the bearing assembly 30 is comprised of two main components, a first member 32 and a thrust bearing cartridge member 34. The member 32 functions to compensate for misalignment or non-perpendicularity between the axis of the screw-down screw 20 and the upper surface 28 of the chock 18. Although the relationship could be reversed, as shown, member 32 has a convex spherical top surface 36 which is received in a correspondingly shaped concave opening formed in the lower end of screw 20. In the embodiment under consideration, member 32 is formed in two separate parts. A first disc-like member 40 which provides the surface 36 and a second supporting member 42 which receives the member 40 and has a planar lower surface 44. It is to be understood however, that the elements 40 and 42 can be formed as one integral or unitary member. The member 32 is continually biased into engagement with the lower end of the screw-down screw 20 by a bearing assembly support frame 46 which will subsequently be described in detail.

Positioned immediately beneath member 32, and also carried from the support frame 46, is the thrust bearing cartridge unit 34. In particular, the thrust bearing cartridge unit 34 includes a generally cylindrical housing member 48 which has its lower end closed by a horizontal plate 50 connected thereto such as by the screws 52. The lower surface 54 of member 50 is generally planar and arranged to be received on the upper surface 28 of chock 18. Positioned within the housing 48 is a pressure block force measuring unit 56 which is connected through a suitable electrical line 58 to indicating devices arranged to give a continuous read-out of the forces applied through the thrust bearing assembly. A plate member 60 is positioned on the top surface of the pressure block 56 and supports a first disc-like thrust roller bearing member 62. Preferably, member 62 is maintained centered on member 60 by a central boss 63. A second similarly shaped member 64 is positioned in facing relationship with member 62 and these two members engage a plurality of tapered rollers 66 which permits them to be freely rotatable relative to one another while transmitting thrust therethrough. The top end of the bearing cartridge is closed by a plate member 68 which engages the top of member 64 and has a boss portion 70 which extends downwardly into an opening 72 formed in member 64. Member 68 is maintained in the cartridge assembly 34 and permitted to be freely rotatable relative thereto by a circular collar 74 which is releasably connected to the housing 48 by a plurality of machine screws 76. A circular bushing 78 is positioned around the interior of collar 74 and engages the outer peripheral surface of member 68. Additionally, a seal member 80 extends circumferentially about member 74 and engages the inwardly extending lip 82 on the collar 74.

As shown, the top surface 84 of member 68 is planar and mates with the lower surface 44 of the first bearing member 32. As can be appreciated, this permits the entire bearing cartridge to be slid horizontally out of position between the screw and the chock simply by raising the screw a very slight amount sufficient to free the cartridge. The first bearing portion, however can remain in position.

Figure 2:
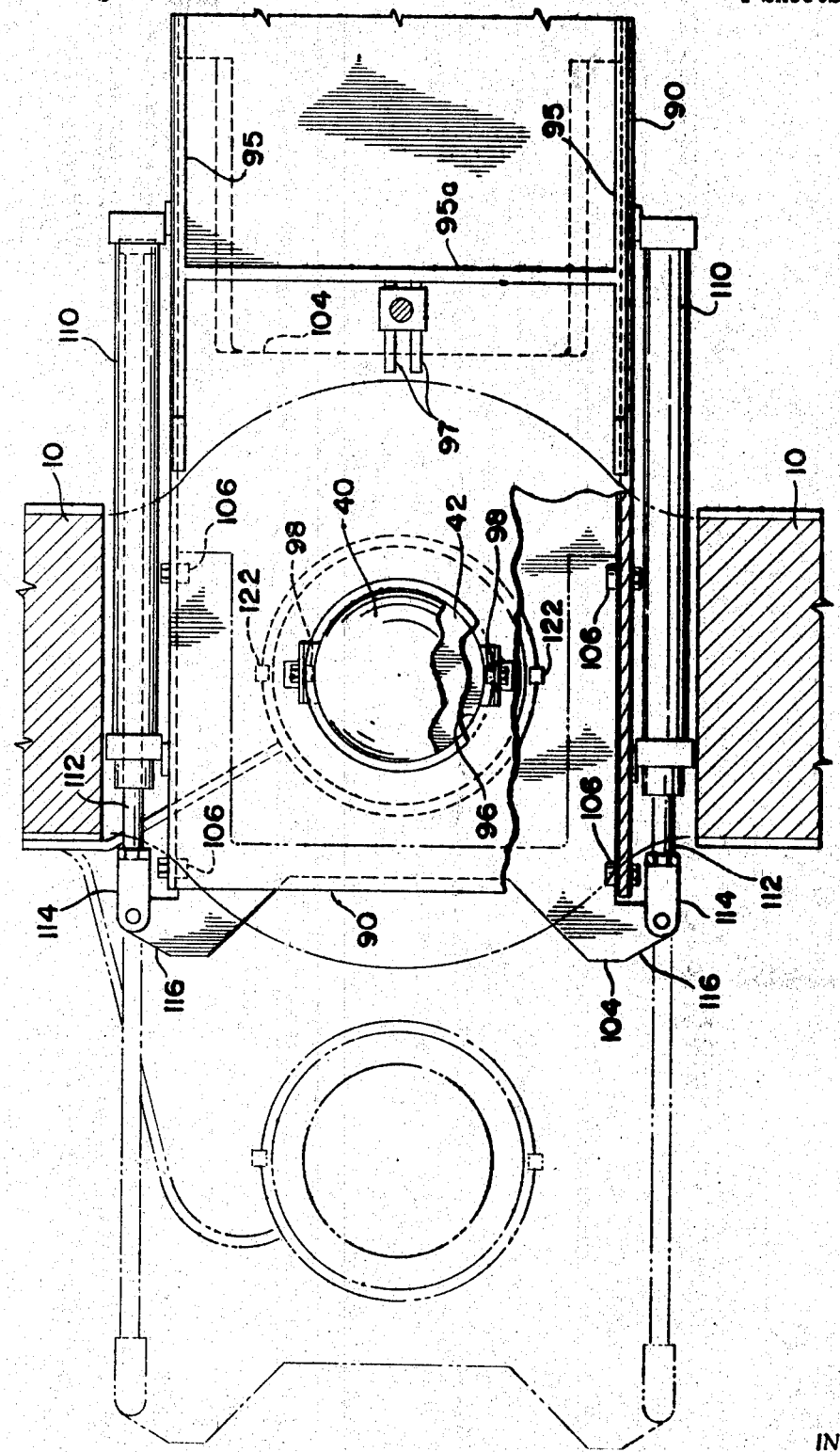
FIG. 2 is an enlarged cross-sectional view taken on line 2—2 of FIG. 1.
Figure 3:
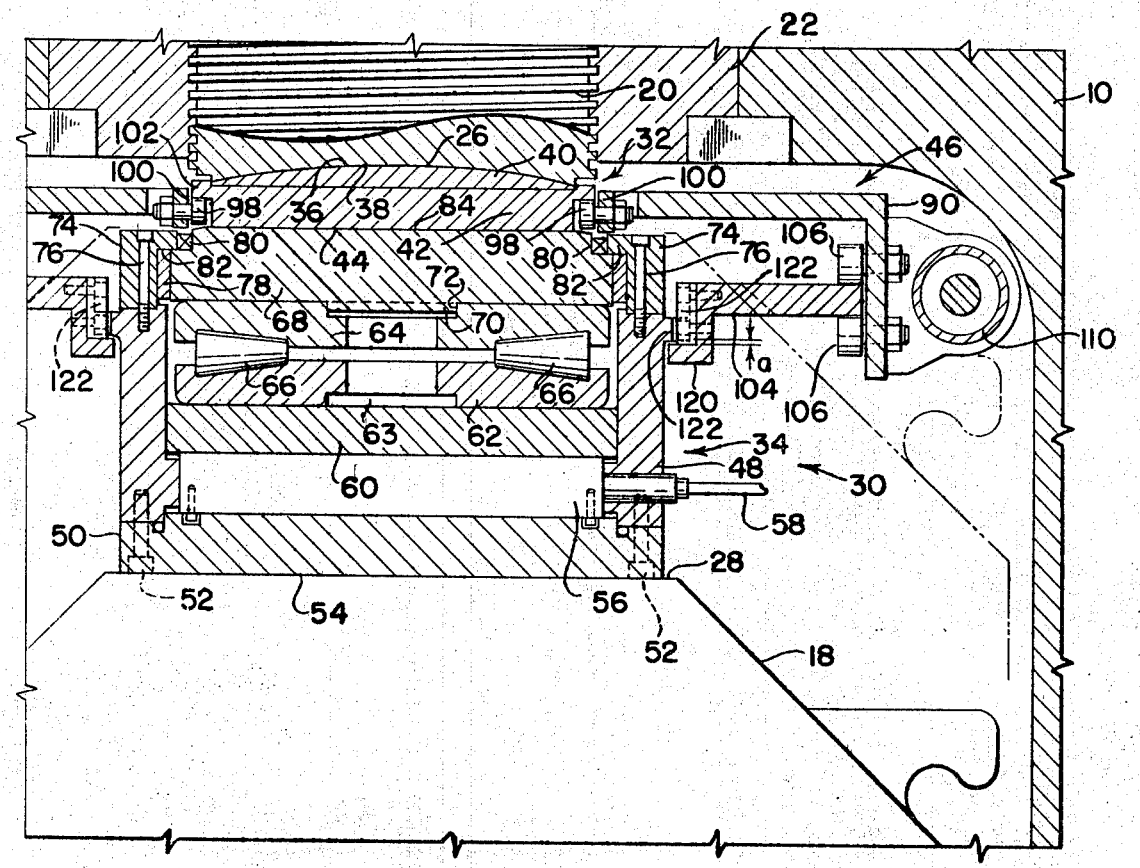
FIG. 3 is an enlarged cross-sectional view taken on line 3—3 of FIG. 1.

A variety of different bearing assembly support structures could be provided for maintaining member 32 continuously biased into engagement with the lower end of screw 20 and providing a movable support for the bearing cartridge unit 34. According to the present invention however, the preferred support means are as best shown in FIGS. 1 through 3. Specifically, the support assembly 46 includes a horizontal, generally U-shaped frame 90 which extends under both screw-down screws 20 and supports both assemblies 30. The frame comprises a metal plate provided with suitable reinforcing members 95 and 95a. The frame 90 is maintained under a continual upward bias by a pair of hydraulic cylinders 91 and 92 arranged to just counterbalance the weight of the frame and bearing assemblies. The cylinders are supported from the mill frame 10 and have their respective piston rods 93 and 94 extending downwardly through openings in the frame into connection with an upwardly extending plate 97 welded to the top of frame 90. Preferably, the cylinders 91, 92 are pivotally connected to the mill frame and the piston rods are also preferably pivotally connected to the member 95. This permits some slight shifting of the frame 90. Referring more specifically to FIGS. 2 and 3, it is seen that the frame 90 is provided with openings 96 which are aligned with the screws 20. As best shown in FIG. 3, the bearing assembly 32 extends downwardly through the opening 96 and is freely supported therein by a pair of rollers 98 which are connected to vertically extending plates or members 100 welded to the inside of opening 96. As shown, the element 42 of the bearing member 32 has a circumferential lip 102 which rests on the rollers 98. Accordingly, the member 32 is supported from the frame 90 while being permitted to shift slightly so as to compensate for any misalignment between the screw 20 and its respective bearing chock 18.

As previously mentioned, the bearing cartridges 30 are also supported from frame 90 and, additionally, are arranged to be moved horizontally from between the screws and chocks. In particular, each of the bearing cartridges 30 are carried in a separate horizontally movable plate member 104. The plate members 104 are slidably carried from frame 90 by rollers 106 which extend inwardly from the downwardly extending legs of frame 90. As shown in FIGS. 2 and 3, two pairs of rollers extend inwardly on each side of the plates 104. This arrangement provides adequate support for the plates and the bearing cartridges while permitting them to be freely movable horizontally out of the mill.

Any of a variety of means could be utilized for selectively moving the plates 104; however, in the preferred embodiment the means utilized comprise pairs of air cylinders 110 which are connected to the outside of the frame 90. The piston rods 112 of the cylinders 110 are in turn connected through a pin and clevice connection 114 with outwardly extending tabs 116 formed on plates 104.

Figure 4:
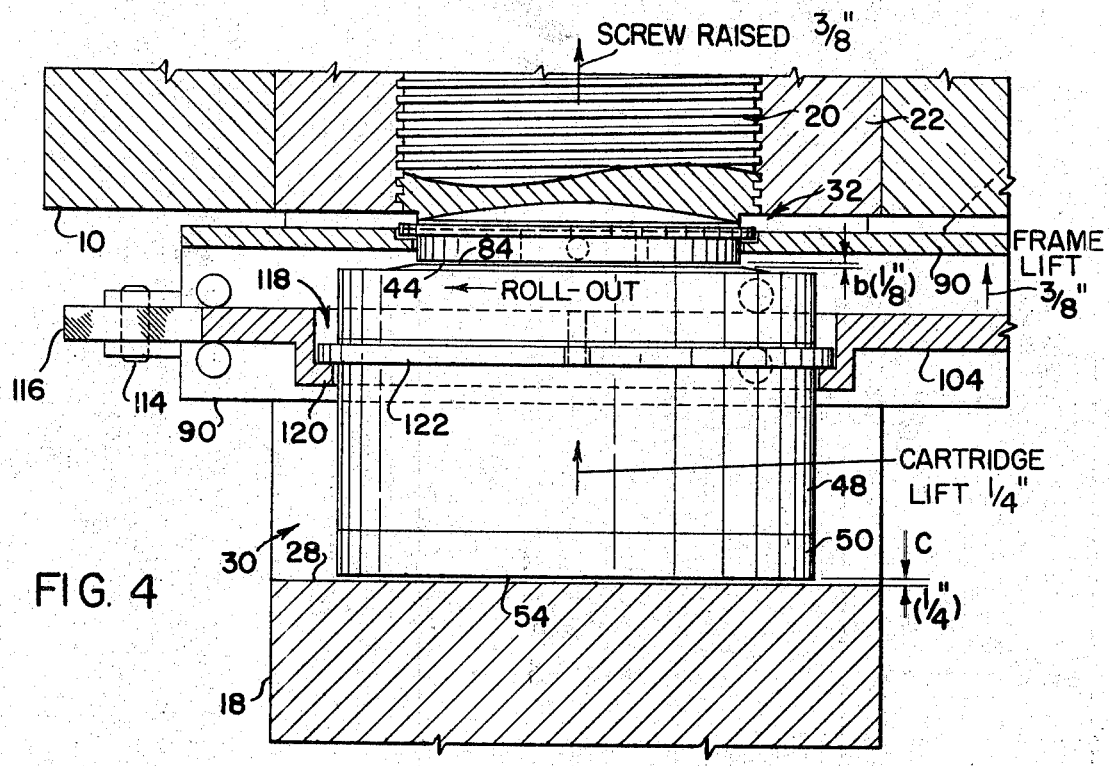
FIG. 4 is an enlarged view showing the relationships between the various elements immediately prior to bearing removal; and, FIG. 5 is an enlarged cross-sectional view taken on line 5—5 of FIG. 2 but showing the bearing in the removed position.

Referring to FIGS. 3 through 4, it is seen that the plates 104 are provided with a central opening 118 which has an inwardly extending lip or flange 120 formed about its lower edge. The flange 120 is arranged to engage an outwardly extending flange 122 formed on the housing 48 of the bearing cartridge 30. Consequently, when the bearing cartridge has been moved to the position shown in FIG. 5, it can be freely removed vertically out of the frame 104. Preferably, the cartridge 30 is prevented from having any rotary movement in the frame 104 by vertically extending keys 123 carried in the opening 118 (see FIGS. 2 and 3). These keys are arranged to fit into corresponding grooves formed on diagonally opposite sides of the flange 122.

Figure 5:
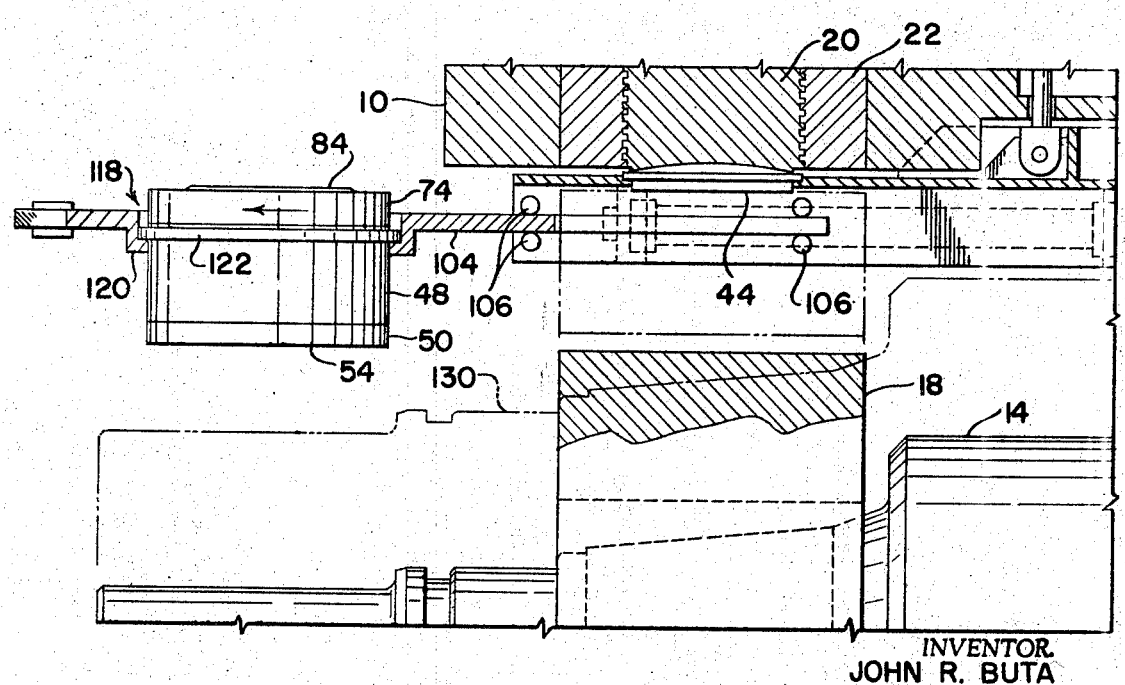

The relationship of the various components during a bearing removal operation can best be seen by reference to FIGS. 3 through 5. FIG. 3 shows the elements in an operative position wherein the bearing assembly is actually transmitting force from the screw-down screw to the bearing chock 18. At this time, the flange 122 on the housing 48 of bearing cartridge 30 is spaced a short distance A above flange 120. When it is desired to remove the bearing cartridges, the screw-down screws 20 are raised a slight amount such as, for example, ⅜ of an inch. With the screw raised this slight amount the frame 90, under the bias of cylinders 91 and 92, maintains the member 32 in engagement with the lower end of the screw. The bearing cartridge 30 however, because of the slight space A which existed between the flange 122 and the flange 120 in the operative position, drops away from member 32 providing a clearance B (which is equal to A) between surfaces 44 and 84. Additionally, because the frame has been raised up a distance greater than A a clearance C results between the lower surface 54 of cartridge 30 and the top surface 28 of the bearing chock 18. Consequently, the bearing cartridge is out of engagement with both members 32 and the respective chock 18. At this time the air cylinders 110 can be actuated to drive the cartridges horizontally out of the mill to the position shown in FIG. 5. This provides a substantial amount of free space above the chocks so that the upper back-up roll may be raised to the position denoted by dotted line 130.

The invention has been described in great detail sufficient to enable one of ordinary skill in the mill art to make and use the same. Obviously, modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. In a rolling mill of the type including a frame, at least one roll including a vertically slidable chock mounted in the frame, and a vertically extending screw-down screw for applying a downwardly acting force to the chock, an improved thrust bearing arrangement including: a generally spherical bearing surface formed on the lower end of said screw; a first bearing member positioned between the screw and the chock and having a top bearing surface formed to mate with the end of the screw and a generally planar lower surface, support means for continuously biasing the first member vertically into engagement with the end of the screw; and, a horizontally slidable thrust bearing cartridges having generally planar upper and lower surfaces and positioned between the first member and the chock, said support means including means for permitting said cartridge to be moved horizontally from between said first member and said chock while said first member is vertically biased into engagement with the end of said screw.

2. The improvement as defined in claim 1 wherein the support means include a horizontal support frame through which the lower surface of said first member extends.

3. The improvement as defined in claim 1 wherein the support means includes a horizontal support frame carried by upwardly acting biasing means connected to the mill frame.

4. The improvement as defined in claim 1 including power means carried by said support means and arranged to shift said cartridge between a first position between said first member and said chock and a second position horizontal thereof.

5. In a rolling mill of the type including a frame, at least one roll including a chock slidably mounted in the frame, and a screw-down screw for applying a downwardly acting force to the chock, an improved thrust bearing arrangement including: a generally spherical bearing surface formed on the lower end of said screw; a first bearing member positioned between the screw and the chock and having a top bearing surface formed to mate with the end of the screw and a generally planar lower surface, support means for continuously biasing the first member into engagement with the end of the screw; and, a horizontally slidable thrust bearing cartridge having generally planar upper and lower surfaces and positioned between the screw and the chock and having a top bearing surface formed to mate with the end of the screw and a generally planar lower surface, support means for continuously biasing the first member into engagement with the end of the screw; and, a horizontally slidable thrust bearing cartridge having generally planar upper and lower surfaces and positioned between the first member and the chock; said cartridge being carried by said support means and arranged so that when said screw is raised said cartridge is spaced a slight distance from said first member.

6. In a rolling mill of the type including a frame, at least one roll including a chock slidably mounted in the frame, a screw-down screw for applying a downward force to the chock, and thrust bearing cartridge means positioned between said screw and said chock, an improved support for said bearing cartridge means comprising; a first support member movably mounted on said frame for upward and downward movement, biasing means for biasing said first support member upward toward said screw, a second support member movably carried by said first support member for horizontal movement, said bearing cartridge means being carried by said second support member during horizontal movement of said second support member.

7. The device of claim 6 wherein said screw has a generally spherical lower end portion, a first bearing member carried by said first support member and positioned between said screw and said bearing cartridge means, said first bearing member having a top surface formed to mate with said end portion of said screw and a generally plane lower surface.

8. The device of claim 6 wherein said screw is movable from a first position applying a downward force to said chock to an upper second position for removal of said bearing cartridge from between said screw and said chock, said bearing cartridge being free of said second support member in said first position of said screw, said second support member being movable upward with said first support member under biasing force of said biasing means to engage said bearing cartridge means and lift said cartridge means from said chock.

References Cited

UNITED STATES PATENTS

| | | | |
|---|---|---|---|
| 891,649 | 6/1908 | Worth | 308—59 |
| 1,544,572 | 7/1925 | George | 308—59 |
| 2,321,329 | 6/1943 | Stafford | 308—32X |
| 2,678,244 | 5/1954 | Simon | 308—59 |
| 2,678,464 | 5/1954 | Spencer | 308—59X |
| 3,044,839 | 7/1962 | Andres | 308—160 |
| 3,168,357 | 2/1965 | Mornigkeit | 308—59 |
| 2,539,752 | 1/1951 | O'Malley | 308—121 |
| 2,853,905 | 9/1958 | Reischer | 294—88X |
| 3,127,831 | 4/1964 | Hamill | 100—168X |
| 3,164,044 | 1/1965 | Trapp | 100—168X |

FRED C. MATTERN, Jr., Primary Examiner

I. SUSKO, Assistant Examiner

U.S. Cl. X.R.

308—59